April 13, 1954     C. H. LUNDHOLM     2,674,773
QUICK RELEASE DEVICE FOR PARACHUTE HARNESS
Filed Aug. 7, 1947     3 Sheets-Sheet 1
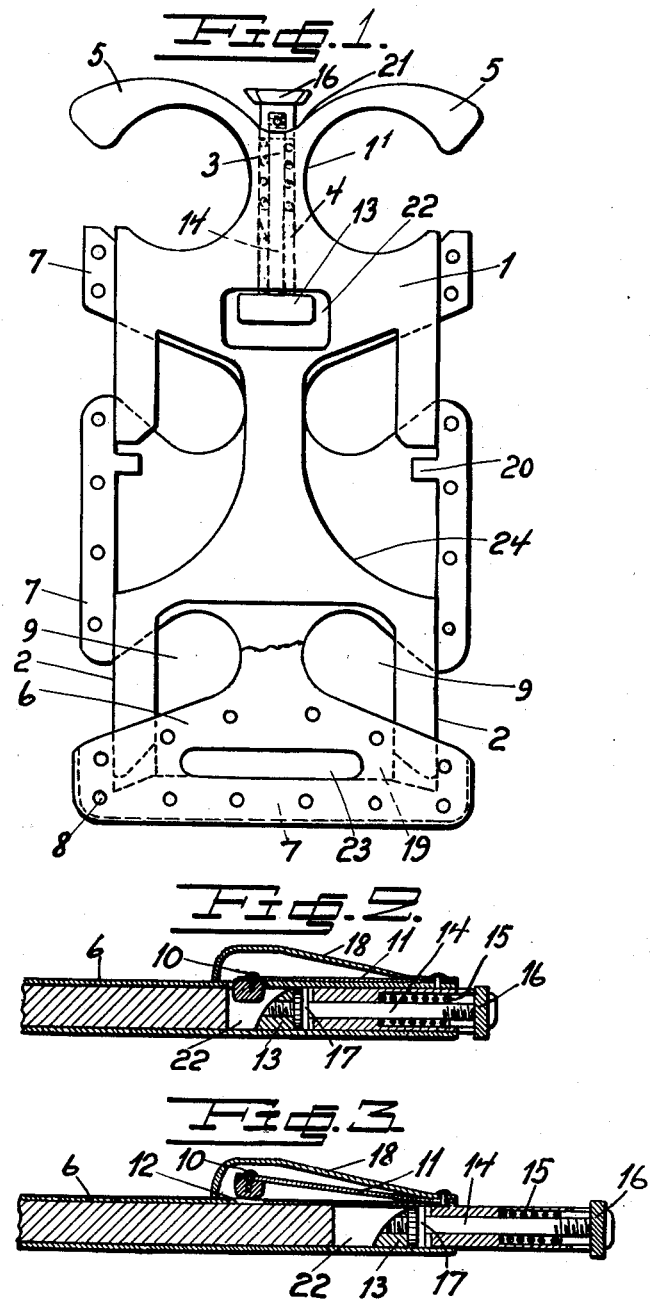

April 13, 1954     C. H. LUNDHOLM     2,674,773
QUICK RELEASE DEVICE FOR PARACHUTE HARNESS
Filed Aug. 7, 1947     3 Sheets-Sheet 2
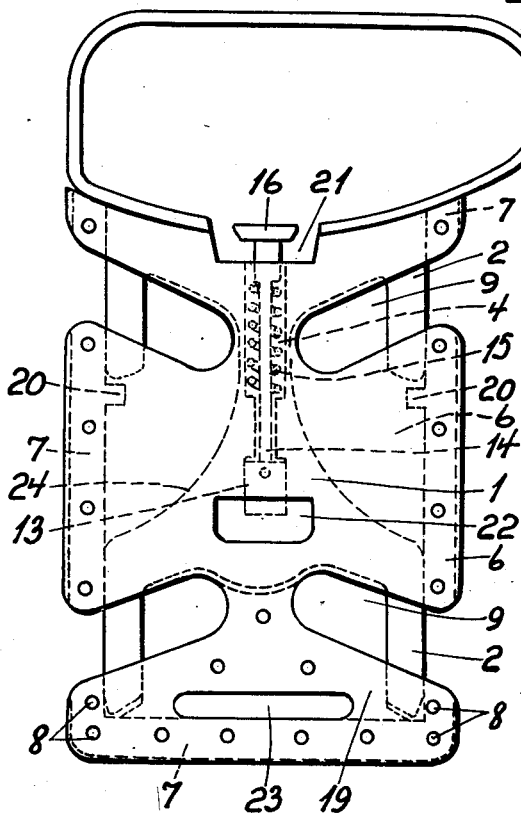
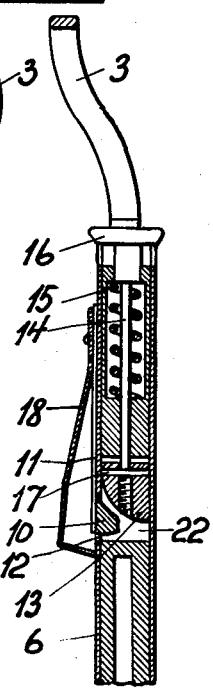
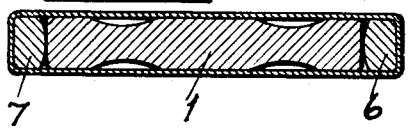
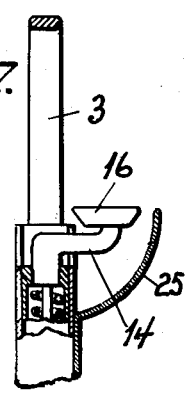
Inventor:

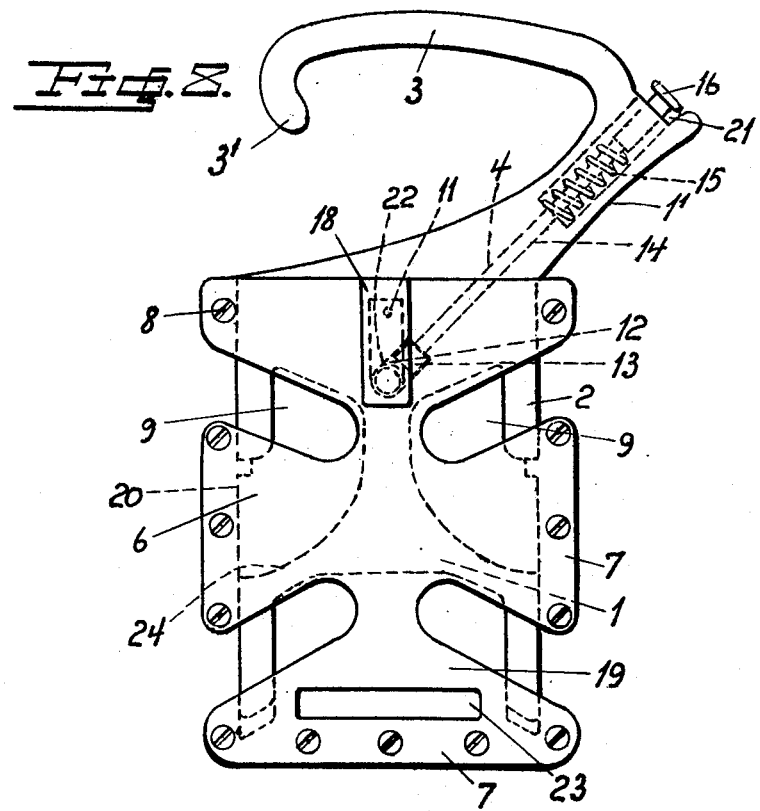

Patented Apr. 13, 1954

2,674,773

UNITED STATES PATENT OFFICE 2,674,773

QUICK RELEASE DEVICE FOR PARACHUTE HARNESS

Carl Herman Lundholm, Stockholm, Sweden

Application August 7, 1947, Serial No. 767,081
In Sweden November 16, 1942

Section 1, Public Law 690, August 8, 1946
Patent expires November 16, 1962

1 Claim. (Cl. 24—205.17)

The present invention relates to a quick release device for a parachute harness adapted to releasably connect a number of free strap ends of the harness. Several quick release devices have already been proposed. As the name implies, the object of such devices is to enable the wearer of the parachute to get quickly free from the harness and the parachute connected with the same. This is of great importance for aviators not only on landings after a jump in strong wind or descent into water, but also at crash landing with the airplane, when the aviator remains sitting in the airplane and is practically unhurt. In such cases it often happens that the airplane catches fire immediately after the impact on the ground. Therefore it is important for the aviator to get out quickly without being hindered by the parachute.

Some of the quick release devices now in use hardly deserve that name, because of the difficulties connected with effecting the release of same. With other such devices the release may be easy, but they may present the risk of getting released prematurely, which may have disastrous consequences. Other devices again may not release the fastening members of the strap ends although the releasing manoeuvre has been effected. This refers both with devices fitted with spring actuated locking pistons and such with locking bolts adapted for snap hooks as fastening members for the free strap ends.

Further most quick release devices have the releasing handles arranged on the outer surface of the device, which arrangement may hinder the user from effecting the grip for the release, especially so, when he is dragged on his stomach along the ground after the inflated parachute. In order to remove the last mentioned drawback, it has being proposed by others to arrange the handle at an edge of the release device. Such handles either consist of a short rounded knob or a finger piece projecting straight outwards from said edge. Such shapes of the handle, however, afford a very poor grip for a parachutist who has to operate the release device under adverse conditions and may be quite useless if he has thick gloves on.

In the present invention, an attempt has been made to eliminate all the drawbacks mentioned and to effect a light, simple and efficient device, with few loose parts, cheap in manufacture with an easy and firm grip, easy manoeuvrable and with a safety device against involuntary release which is both effective and easy to manoeuvre and with outer means which are easily accessible, even if the jumper should be in a difficult position after landing. Another important feature of the device consists in a low height and small other dimensions. Thus the height is ⅜ to ½ in. the diameter or the length 3 to 5 inches outside of the handle.

One of the chief features of a device according to this invention is that it is fitted with a movable member housed in a casing and adapted to releasably engage a number of fastening members preferably snap hooks arranged on the free strap ends of the harness and that the said movable member at its outer portion is fitted with a handle for the release which is arranged at one lateral edge of the device, the same having such a length along said edge that it enables the user to get an easy and firm grip under all circumstances.

Release devices according to this invention are divided into two chief categories, viz: principally rectangular and principally circular ones. With the former the release is effected by a pull sideways, with the latter by a rotating movement. Both types are preferably fitted with a movable member provided with a number of hooking arms, which are adapted for releasably holding the same number of hooks. The major part of the movable member and the hooking arms are enclosed in a casing consisting of two opposed plates and intermediate oblong fairly narrow metal slabs which latter serve as framing for the casing peripherally spaced. Openings for the introduction of the hooks are provided at the edges of the casing.

Another chief feature consists of a safety device against involuntary release, which is characterized both by simplicity, efficiency and easy manoeuvrability.

Further special means are provided both in rectangular and circular devices to prevent the snap hooks from getting stuck in the device, although the release has been effected. This is done by the movable member being shaped so, that it pushes out the hooks when operated.

Great attention has also been paid to reduce the friction between the movable member and its arms on the one part and the casing with its side pieces on the other part as well as between the locking arms and the snap hooks. To this end all surfaces which are exposed to load are rounded off.

The mouths of the openings at the casing edges are preferably rounded, thereby eliminating the risk of the snap hooks getting stuck there. The said openings are further arranged so that two adjoining openings form an angle of about 60 degrees in relation to each other. Another feature for the purpose of avoiding any clenching of the snap hooks is that the main loops of these have a sufficient width as to embrace the adjoining parts of the casing.

The metal plating forming the casing is preferably bent over at the edges, whereby the strength of device is increased greatly. The casing is secured to the framing side pieces by rivets or screws.

A suitable form of construction of the safety device to prevent involuntary release is the following:

A pawl arranged at the end of a flat spring fixed at the outer surface of the casing serves as locking means for the movable movable member, when the same is in a closed position. Through an opening in the casing, the pawl gets into engagement in a deep notch with vertical walls in the movable member, the flat spring holding it down then. The side of the pawl directed towards the handle is fitted with an inclined cut pointing downwards. Near the pawl and located in the same recess there is a piston which also is cut off inclinedly but in the opposite direction, the cut being turned upwards, which piston is secured to a pin, preferably by screw threads. This pin is further located in a canal adjoining the notch, which canal continues to the outer portion of the movable member, the latter part of the canal being enlarged to hold a coil spring. At the outer end of the pin a knob is arranged, which knob is preferably located in a recess of the outer portion of the movable member, the coil spring resting against the knob fixture. Through the effect of the coil spring the knob is somewhat pushed outwards. When the knob is pushed inwards by the user's thumb the piston arranged at the other end of the pin is moved under the pawl, thereby pushing it out of its engagement. When the pressure upon the knob is let off the pawl falls back into the notch. The pawl and the flat spring are protected by a hood of metal plating.

So far principally features common to both rectangular and circular release devices have been dealt with. The two types, however, also have several different features. These refer especially to the shapes of the handle, the shapes of the pawl and the piston, and the means for pushing out the snap hooks at the release.

As far as the releasing handle is concerned, a number of variations are possible with rectangular devices whereas only a couple are suitable for circular ones.

For the former type, the handle can consist of two arms forming a substantially straight line and placed beside each other the outer short end of the movable member being concavely cut opposite each arm; the releasing knob for the safety device being arranged in a recess between them. This type of handle, however, is only suitable for use by bare hands or such fitted with gloves with separate rooms for each finger; so called summer gloves.

Another type consists of a big ring which may also be used with winter gloves i. e. with one room for all fingers except the thumb which ring is secured to a concave cut at the outer end of the movable member. As the thumb, in a closed fist, is situated somewhat below the other fingers it is suitable to bend the handle upwards in a S-form. It is also possible to make the handle straight and to place the releasing knob a little below the casing the outer pin holding the same being bent principally in a S-form. In order to avoid clashing with the lower snap hooks the lower short end of the handle is made to form principally a straight line with the lower edge of the casing.

Finally, the handle may be shaped as a single arm which is fixed with its upper end at a long extension of the movable member; the releasing knob being arranged in a recess of that extension on a rectangular device, the extension is tapered from the edge of the casing to the point of fixture of the handle.

The latter shape is the most suitable one for circular devices, but also a closed ring with the upper end fixed at the said extension may be employed in this case. In order to make the handle as long as possible without the risk of its lower end clashing with the lower snap hooks, it is advantageous to make the side sections of a circular device at least 50% as long as the middle sections. A suitable length of the handle is one equal to about ⅔ of the diameter of the device. Further the extension of the locking bolt should be practically parallel with the line of prolongation of the upper opening of the casing which is situated to the right when the device is in use. The handle is also preferably made parallel with the adjoining edge of the device with the lower free end rounded and bent inwards. This latter remark also refers to rectangular devices. Finally it is advantageous with a circular device to provide the inner side of the handle with a number of recesses to make the grip as firm as possible.

Because of the different shapes of rectangular and circular release devices, it is necessary to make the pawl of engagement and the appertaining piston also of different shapes. Thus the most suitable forms of these members on rectangular devices are principally rectangular but with rounded edges and on circular ones principally cylindrical; in all case with inclined cuts as mentioned before.

Also the means for pushing out the snap hooks are different in rectangular devices from those in circular ones. Thus it is the hooks arranged to the right in rectangular ones and those arranged below in circular ones, which require such means. In the former case, the movable member at the middle portions situated to the left of the arms to the right are provided with inclined concave cuts on both sides and tapered outwards towards the longitudinal middle line of the movable member. In circular devices the portions of the movable member situated opposite the respective arms are made principally straight with an inclination towards the left arm, when worn, of 5 to 10 degrees and inclination towards the right arm of 30 to 40 degrees. It follows without saying that the distance of the said portions of the movable member is such that the openings at the edges are free from the same, when the device is in a closed position.

In a rectangular device, it is further advisable to make the broad surfaces of the locking bolt of such a shape that the friction between the bolt and the metal plating is reduced, in case the latter on heavy loads should be stretched and get quite close to the former. For that purpose the bolt is provided with one or more longitudinal concavities with rounded elevations between them.

The invention is further illustrated on the accompanying drawings:

Fig. 1 shows a perspective view of a rectangular device the handle of which consists of two arms.

Fig. 2 is a lateral section of a safety device against involuntary release in a released position.

Fig. 3 is a lateral section of a safety device in a closed position.

Fig. 4 is a perspective view of a rectangular device, the handle of which is formed as one single ring.

Fig. 5 is a lateral section of the handle in Fig. 4 bent in S-form together with a safety device.

Fig. 6 is a lateral section of the casing and the enclosed movable member, the latter being provided with longitudinal concavities and elevations.

Fig. 7 is a lateral section of the handle and part of the safety device the outer members of which are placed at a lower level than the casing.

Fig. 8 shows a perspective view of a principally rectangular device the handle having the shape of a single arm arranged at a long extension of the movable member.

Fig. 9 shows a perspective view of a circular device, the handle of which is formed to a single arm arranged at a long extension of the movable member.

The various details are numbered as follows: 1 is the main portion of the movable member, $1^1$ an outer extension thereof. 2 are hooking arms belonging to the member 1. 3 shows the releasing handle, $3^1$ the rounded bent in free end of a one armed handle, $3^2$ small recesses on the inside of the latter type when used on circular devices. 4 shows a canal in the movable member 1 and its extension $1^1$. 5 shows two arms appertaining to a handle. 6 is the casing, $6^1$ a plate of reinforcement on a circular device, $6^2$ a screw of rotation on a circular device. 7 shows lateral metal pieces forming the frame of the casing. 8 are rivets or screws for holding the casing together. 9 are peripherically spaced openings in the casing for the snap hooks. 10 is a pawl of engagement. 11 a flat spring holding the pawl 10. 12 is an opening in the casing for the introduction of pawl 10. 13 shows a release piston for disengaging pawl 10. 14 a pin bearing the said piston. 15 shows a coil spring surrounding pin 14. 16 is a knob by which the piston 13 may be pushed inwards, 17 a screw for fastening the piston to the pin. 18 is a small hood for protecting the pawl 13 and the flat spring 11. 19 shows a metal slab for stabilizing the casing 6. 20 are projections at the lateral pieces 7 for stopping the movement of the movable member. 21 shows a recess in the outer portion of the movable member for the knob 16. 22 is a recess or hole in the movable member for the pawl 10. 23 is a slot for fastening the device permanently to the harness. 24 is an inclined concave cut on the movable member for pushing out the right hand snap hooks. 25 is a cover for the knob 16 when placed as shown in Fig. 7. 26 is the portion of the movable member at a circular device pushing out a left snap hook, 27 is the portion of the movable member at a circular device pushing out a right snap hook.

Several variations within the scope of the invention are possible.

Thus the quick release devices described may with some modifications be employed for such harnesses as are provided with a central release device and two lateral devices placed below same adapted for releasably holding one leg strap each, which devices are actuated from the central one in a known manner.

Also release devices embodying spring actuated pistons of the usual type may be fitted with some of the handles and the safety device described in the foregoing.

Having now particularly described the invention and in what manner the same is to be performed what I claim is:

A quick release device for a parachute harness comprising a casing of substantially rectangular configuration including two opposed plates and elongated metal frame pieces extending along both longitudinal edges and one of the lateral edges of said plates for securing said plates together in spaced apart relationship, said casing having peripherally spaced openings arranged in pairs and opening through the longitudinal edges of said plates and the related frame pieces for receiving fastening members carried by the strap ends of a parachute harness, a movable member slidable longitudinally between said opposed plates of the casing and through the other lateral edge of the casing, said movable member including longitudinally extending hooking arms at the opposite sides thereof and bearing against the inside edges of said framing pieces at the longitudinal edges of said casing, said hooking arms in one longitudinal position of the movable member included within said casing extending across said openings for engaging fastening members received in the latter and in another position, in which said movable member is partially withdrawn from said casing through said other lateral edge of the latter, said hooking arms being clear of said openings to free the fastening members, an operating handle secured to the one lateral end of said movable member adjacent said other lateral edge of the casing and including a laterally extending elongated gripping portion spaced from said one lateral end of the movable member and at least as long as said one lateral end to permit said gripping portion to be easily grasped for displacing said movable member to said partially withdrawn other position thereof, and a releasable latch device for retaining said movable member in said one longitudinal position thereof, said movable member having a recess and one of said plates of the casing having an opening therein which registers when said movable member is in said one longitudinal position thereof, and said latch device including a pawl member, a leaf spring mounted on said one plate of the casing and carrying said pawl member to continuously urge the latter into said opening of said one plate and into said recess of the movable member when the latter is in said one longitudinal position, said movable member having a longitudinal bore between said recess therein and said one lateral end, a plunger slidable in said bore and projecting at one end from said one lateral end of the movable member for manual actuation, a pawl releasing member on the other end of said plunger and having an inclined face engageable with said pawl member in said recess to move said pawl member out of said recess when said plunger is moved in the direction opposed to the direction of movement of said movable member from said one position to said other position of the latter, and resilient means acting on said plunger and continuously urging the latter in said direction of movement of the movable member to said other position thereof.

References Cited in the file of this patent

UNITED STATES PATENTS

| Number | Name | Date |
| --- | --- | --- |
| 2,003,205 | Kuhlemann | May 28, 1935 |
| 2,108,491 | Kuhlemann | Feb. 15, 1938 |
| 2,171,496 | Waite et al. | Aug. 29, 1939 |
| 2,393,072 | Skinner | Jan. 15, 1946 |
| 2,393,178 | Manson | Jan. 15, 1946 |